T. G. MATTSON.
HARROW.
APPLICATION FILED JULY 7, 1915.

1,230,194.

Patented June 19, 1917.
3 SHEETS—SHEET 1.

Witnesses
W. C. Mulligan
W. E. Valk, Jr.

Inventor
Theodore G. Mattson
By Richard Bowen,
Attorney

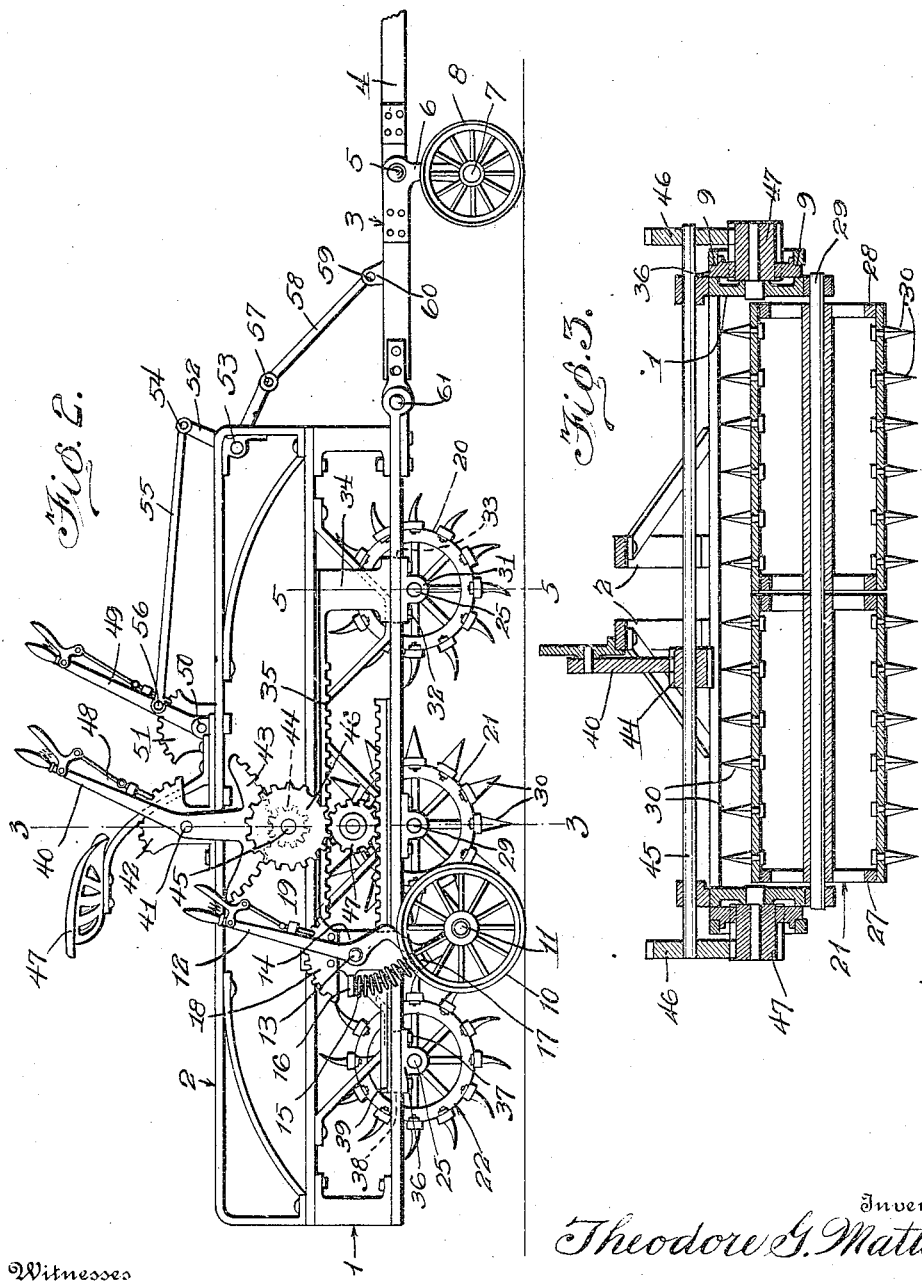

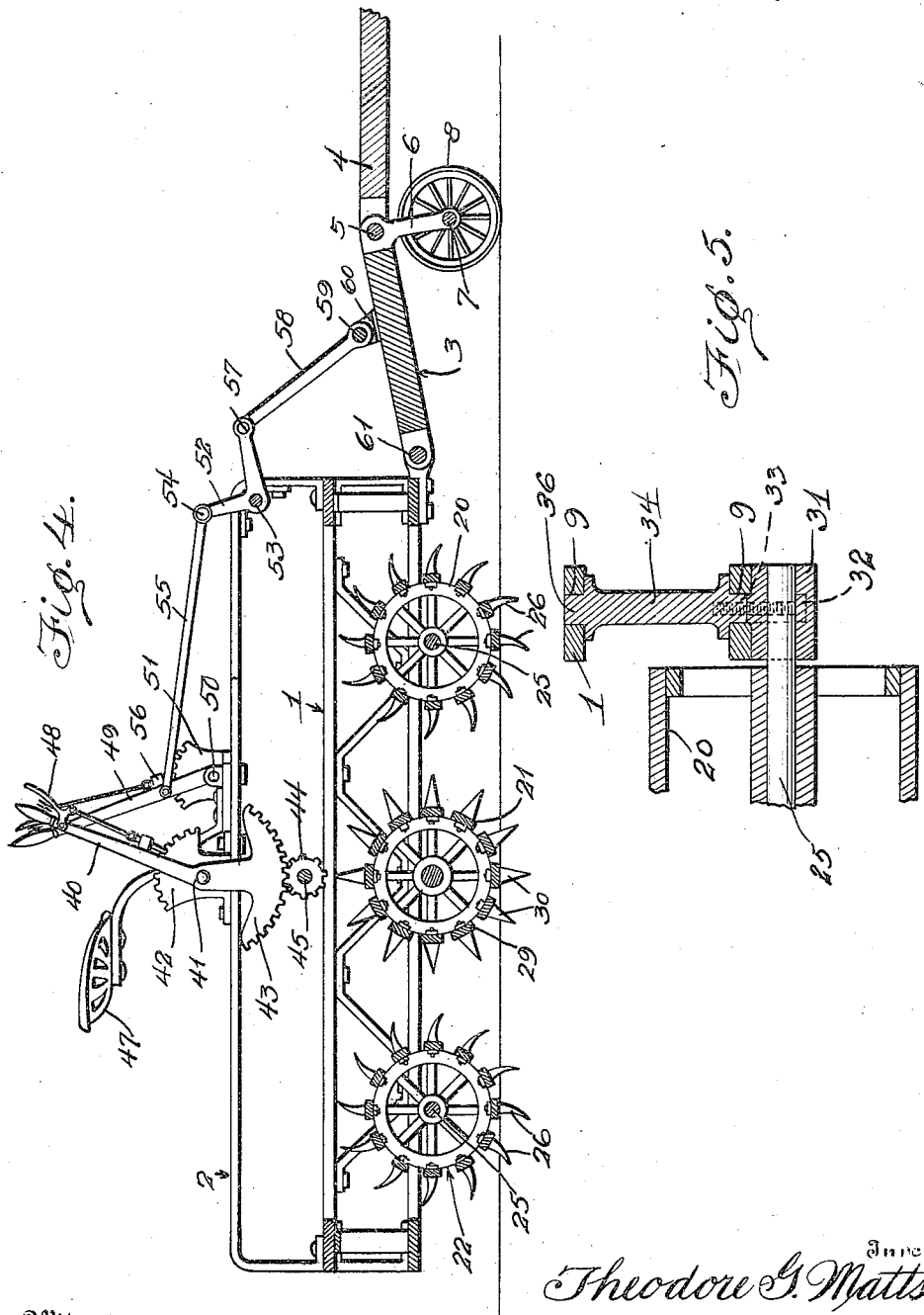

UNITED STATES PATENT OFFICE.

THEODORE G. MATTSON, OF BREMEN, NORTH DAKOTA.

HARROW.

1,230,194.  Specification of Letters Patent.  Patented June 19, 1917.

Application filed July 7, 1915. Serial No. 38,544.

*To all whom it may concern:*

Be it known that I, THEODORE G. MATTSON, a citizen of the United States, residing at Bremen, in the county of Wells and State of North Dakota, have invented certain new and useful Improvements in Harrows, of which the following is a specification.

My invention relates to harrows and more particularly to harrows of the "kill-root" type.

An object of the invention is to provide a harrow wherein improved rotary toothed cylinders are utilized to pulverize or disintegrate the soil.

A further object of the invention is to provide in a harrow toothed cylinders of a novel type whereby quack-grass, weeds and like injurious growths may be uprooted, turned, cut, and as a result eliminated.

I further contemplate a means whereby the shafts upon which the cylinders are mounted may be moved toward and from one another in order that the degree of fineness with which the earth or soil is pulverized may be varied.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Fig. 2 is a side elevation;

Fig. 3 is a section on the line 3—3 of Fig. 2;

Fig. 4 is a longitudinal sectional view; and

Fig. 5 is a section on the line 5—5 of Fig. 2.

Figure 1:
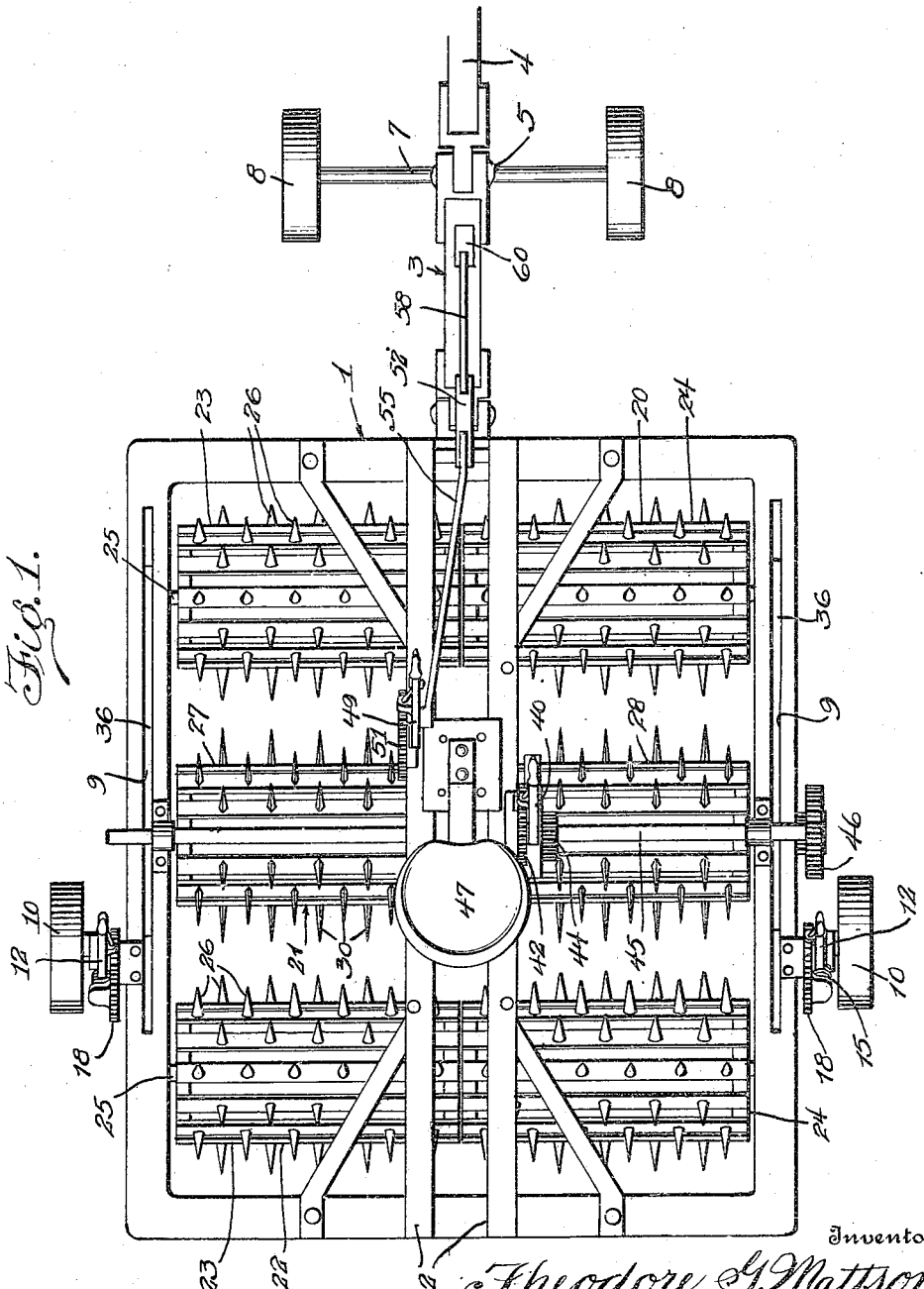
Figure 1 is a top plan view of my improved harrow.

Before proceeding with the description of the drawings, I desire to call attention to the fact that while I have evolved my invention with particular reference to its use as a root killer or quack grass eliminator, the same, if desired, may be used as before suggested merely to pulverize and cultivate previously plowed ground.

Referring now to the drawings by numerals, 1 designates as an entirety the main frame, 2 as an entirety an auxiliary or supplemental frame and 3 as an entirety the machine truck to which the draft tongue 4 is pivoted as at 5. An arm 6 is hung to depend from the truck 3 to mount at its free end an axle 7 upon which the forward guide or supporting wheels 8 are mounted.

The main frame 1, or rather the longitudinal beams at each side of the frame are slotted as indicated at 9 for a purpose subsequently to appear.

Rear supporting wheels 10 are mounted, each on an axle 11 individually movable through manipulation of an associate lever 12. In view of the fact that the mechanism associated with each wheel 10 is in duplicate, a description of but one of the said mechanisms will ensue. The lever 12 is pivoted as at 13 to a suitable bracket or casting 14 affixed to the main frame 1. Said lever, at its lower end, acts as a bearing support for the rear axle section 11, and in its normal position, so positions the wheel 10 that the main frame 1 will be elevated above the ground a sufficient distance to remove the pulverizing cylinders (later to be referred to) entirely out of engagement with the ground. A contractile spring 15 is secured at one end to a lug 16 integral with the casting 14 and at its opposite end to a lug 17 integral with the lever 12 so that the wheel 10 will have a tendency to move automatically, when released, into the position stated. A quadrant 18 is secured to the bracket in such proximity to the lever 12 and a sliding pawl 19 mounted thereon as to engage therewith and afford a locking means whereby said lever may be held in its adjusted position.

The harrow or machine in its preferred embodiment is equipped with three pulverizing cylinders (there may be more) designated respectively, and each as an entirety, 20, 21 and 22, the first and last, 20 and 22 being relatively movable to vary the degree of fineness with which the earth or soil is pulverized during advancement of the machine.

Each of the mentioned cylinders 20 and 22 is made up of duplicate cylinder sections designated respectively 23 and 24. Said cylinder sections, or rather the two sections constituting each cylinder, are mounted on a shaft 25 common to both sections. The sections 23 and 24, in actual practice, may retate independently one of the other that in turning the machine around the "drag" or "pull" will be materially reduced. Teeth 26, arranged in staggered relation, project from the outer surface of each cylinder section that the ground or soil engaged by the cylinders may be pulverized and to a certain extent upturned.

The intermediate cylinder 21 is substantially a duplicate of the cylinders 20 and 22 in that it is made up of duplicate sections 27 and 28, mounted on a single shaft 29 and provided with staggered surface teeth 30. The teeth however of this cylinder are provided with cutting edges that all roots, grass and weeds upturned or contacted may be severed and cut to assist materially in their ultimate elimination.

The shaft 25 of the forward cylinder 20 is journaled in suitable bearings 31 therefor, mounted to engage with the underside of the main frame 1. The mentioned bearings are secured as is indicated at 32 to an extension 33 integral with an enlargement 34 of a rack bar 35. The extensions 33 operate within the slots 9 of the frame, that the cylinder 20 during adjustment may be directed or guided in its movement. Rack bar 35, like the enlargement 34 thereof is provided with an extension or guide flange 36. Said extension is adapted to fit one of the slots 9 therefor.

Cylinder 22, or to be more correct, the shaft 25 thereof is mounted in bearings 36 which, like the bearings 31 engage with the underside of the machine frame. The bearings 36 are each secured as indicated at 37 to an extension 38 integral with a rack bar 39. Rack bar 39 is mounted to rest upon the top face of one of the longitudinal beams of the main frame 1 and the rack bar 35 against the under face of a parallel beam spaced therefrom. By such arrangement it is apparent that the teeth of the respective rack bars are opposed.

Cylinders 20 and 22 move toward and from the cylinder 21 in unison, such movement being obtained through manipulation of a lever 40 pivoted as at 41 to a quadrant 42 in turn secured above the auxiliary frame 2. Lever 41 is itself provided with an integral quadrant structure 43, the teeth of which engage or mesh with a pinion 44 mounted on a shaft 45 disposed to extend transversely of the machine. Gear wheels 46 are mounted in the opposite ends of the shaft 45 to engage with relatively elongated pinions 47 which in turn engage with the teeth of the rack bars 35 and 39. Through rotation of the shaft 45, obtained in an obvious manner, the rack bars may be relatively moved and the cylinders 20 and 22 properly adjusted. The lever 40 is located in proximity to the operator's seat designated 47. Lock mechanism 48 of the sliding pawl type may be associated with the lever 40 that the cylinders 20 and 22 may be held against movement when adjusted.

A third lever 49 is pivoted to a segment 51 secured to the supplemental frame, this latter lever as will hereinafter appear, having connection with the truck 3 that the forward wheels 8 may be elevated relatively to the main frame 1 when cylinders 20, 21 and 22 are lowered into engagement with the ground as shown to advantage in Fig. 4. A bell crank lever 52 is pivoted as at 53 forwardly of the supplemental frame and pivotally connected at one end or as indicated at 54 to a rod 55 connected at its opposite end or as at 56 with the lever 49. Said lever 52 at its opposite end is pivotally connected as at 57 with a rod 58 in turn pivoted as at 59 to a lug 60 on the truck 3. The truck has a pivotal connection as indicated at 61 with the main frame of the machine.

From the foregoing, taken in connection with the accompanying drawings it is evident that the several cylinders may be raised entirely out of engagement with the ground to facilitate transportation of the machine from place to place; that the truck wheels may be adjusted relatively of the main frame through manipulation of the lever 49, that the said main frame may at all times lie in a substantially horizontal plane; and that the adjustment of the cylinders 20 and 22 is obtained through manipulation of a single lever, the mentioned cylinders moving, as above pointed out, simultaneously or in unison.

Having thus fully described my invention, what I claim as new and desire to secure by Letters Patent is:—

1. In a machine of the character described, a main frame, a cylinder mounted to rotate from a fixed axis, relatively adjustable rotary cylinders, a rack bar for each adjustable cylinder, and a single element mounted to engage the respective rack bars for simultaneously moving the adjustable cylinders.

2. In a machine of the character described, a main frame, supporting wheels therefor, a plurality of rotary cylinders, means to raise and lower the supporting wheels relatively to the frame for moving the cylinders either into penetrating engagement with or entirely out of engagement with the ground, a wheeled truck pivotally connected to the main frame, and means operable to swing the truck at various angles relatively to the frame, as and for the purpose set forth.

3. In a machine of the character described, a main frame, a sectional cylinder mounted to rotate centrally of the frame and from a fixed axis, cutting teeth projecting from the outer surface of the cylinder sections, relatively adjustable rotary cylinders, each cylinder comprising a plurality of cylinder sections mounted for independent rotation, curved teeth projecting from the outer surface of the adjustable cylinders, a single element operable to simultaneously move the adjustable cylinders toward and from the first mentioned cylinder, and means to raise and lower the several cylinders bodily into and out of engagement with the ground.

4. In a machine of the character described, a main frame, supporting wheels therefor, a cylinder mounted to rotate from a fixed axis, cutting teeth projecting from the outer surface of said cylinder, relatively adjustable rotary cylinders, curved teeth projecting from the outer surface of said last mentioned cylinders, a rack bar for each adjustable cylinder, a guide means for each rack bar, a single rotary element mounted to engage each rack bar to simultaneously move the adjustable cylinders either toward or from said first mentioned cylinder, a means to raise and lower the supporting means relatively to the frame for moving the several cylinders bodily into and out of engagement with the ground, a wheeled truck pivoted to and forwardly of the frame, and means mounted on the main frame and engaging the truck for raising and lowering the wheels thereof during adjustment of the supporting wheels to permit engagement of the several cylinders with the ground, substantially as described.

In testimony whereof I affix my signature in presence of two witnesses.

Mr. THEODORE G. MATTSON.

Witnesses:
C. E. HEDSTROM,
K. H. BUECHLER.

Copies of this patent may be obtained for five cents each, by addressing the "Commissioner of Patents, Washington, D. C."